United States Patent [19]

Nunomura et al.

[11] Patent Number: 5,432,650
[45] Date of Patent: Jul. 11, 1995

[54] MAGNETIC TAPE RECORDING/REPRODUCING APPARATUS HAVING AUTOMATIC MODE CONTROL

[75] Inventors: Kunihiro Nunomura, Yokohama; Koichi Ono, Yokosuka; Shigeyuki Itoh, Kawasaki; Iwao Aizawa; Tadasu Horiuchi, both of Yokohama, all of Japan

[73] Assignee: Hitachi, Ltd., Tokyo, Japan

[21] Appl. No.: 908,177

[22] Filed: Jul. 2, 1992

[30] Foreign Application Priority Data

Jul. 10, 1991 [JP] Japan .................... 3-169658
May 15, 1992 [JP] Japan .................... 4-123201

[51] Int. Cl.$^6$ .................... G11B 5/02; H04N 5/78
[52] U.S. Cl. .................... 360/27; 360/10.1
[58] Field of Search ........ 360/27, 19.1, 48, 14.1–14.3, 360/10.1

[56] References Cited

U.S. PATENT DOCUMENTS

| | | | |
|---|---|---|---|
| 4,394,745 | 7/1983 | Menezes et al. | 360/14.1 X |
| 4,583,134 | 4/1986 | Nakamichi | 360/27 X |
| 4,675,753 | 6/1987 | Takayama et al. | 360/27 |
| 4,764,822 | 8/1988 | Taniguchi et al. | 360/48 |
| 5,210,659 | 5/1993 | Oguri et al. | 360/27 |

FOREIGN PATENT DOCUMENTS

| | | |
|---|---|---|
| 203797 | 12/1986 | European Pat. Off. |
| 405939 | 1/1991 | European Pat. Off. |
| 59-221851 | 12/1984 | Japan |
| 01079990 | 3/1989 | Japan |
| 3162754 | 7/1991 | Japan .................... 360/19.1 |

OTHER PUBLICATIONS

The New Recording Studio Handbook, Woriam & Kefaurer, pp. 374–379, 1990.

Primary Examiner—Aristotelis Psitos
Assistant Examiner—Jennifer P. Wright
Attorney, Agent, or Firm—Antonelli, Terry, Stout & Kraus

[57] ABSTRACT

A VTR capable of recording information signals, such as a time code, and more particularly providing a configuration for after-recording the information signals for controlling the operation of the VTR, which comprises an operation panel; a mode determination block for determining a mode to be next switched; an information signal processing block for recording and reproducing the information signals; and a recording period setting circuit for determining a recording period of the information signals. A mode signal inputted through the operation panel is recorded on a predetermined position on a magnetic tape. When such a magnetic tape is reproduced, the VTR is forcibly set in a mode determined by the mode signal at the time of detecting the mode signal. For example, if a mode signal indicative of a fast-forward mode and another mode signal indicative of a normal reproduction mode have been recorded prior to and at the back of a recorded portion which need not be reproduced, the undesired recorded portion can be automatically fast-forwarded when this tape is normally reproduced.

1 Claim, 14 Drawing Sheets

TAPE RUNNING DIRECTION

| OPERATION MODE | BIT 0 | BIT 1 | BIT 2 | BIT 3 | BIT 4 | BIT 5 | BIT 6 | BIT 7 |
|---|---|---|---|---|---|---|---|---|
| NORMAL REPRODUCTION | 0 | 0 | 0 | 0 | 0 | 0 | 1 | 0 |
| SEARCH (FAST-FORWARD) | 1 | 0 | 0 | 0 | 0 | 0 | 1 | 0 |
| SEARCH (REWIND) | 0 | 1 | 0 | 0 | 0 | 0 | 1 | 0 |
| STILL | 1 | 1 | 0 | 0 | 0 | 0 | 1 | 0 |
| SLOW | 0 | 0 | 1 | 0 | 0 | 0 | 1 | 0 |
| FAST-FORWARD | 1 | 0 | 1 | 0 | 0 | 0 | 1 | 0 |
| REWIND | 0 | 1 | 1 | 0 | 0 | 0 | 1 | 0 |
| DOUBLE SPEED REPRODUCTION | 1 | 1 | 1 | 0 | 0 | 0 | 1 | 0 |

F I G. 16
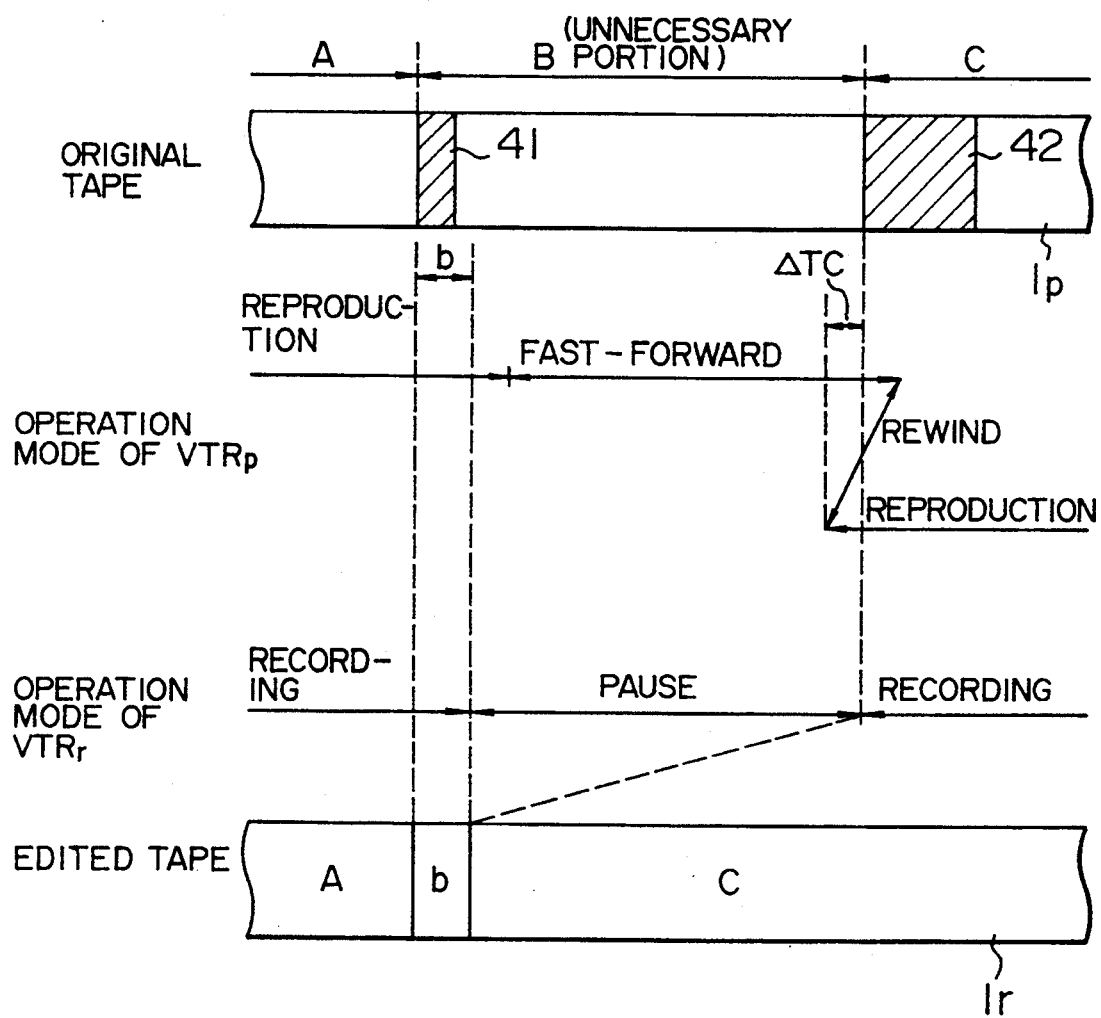

F I G. 18
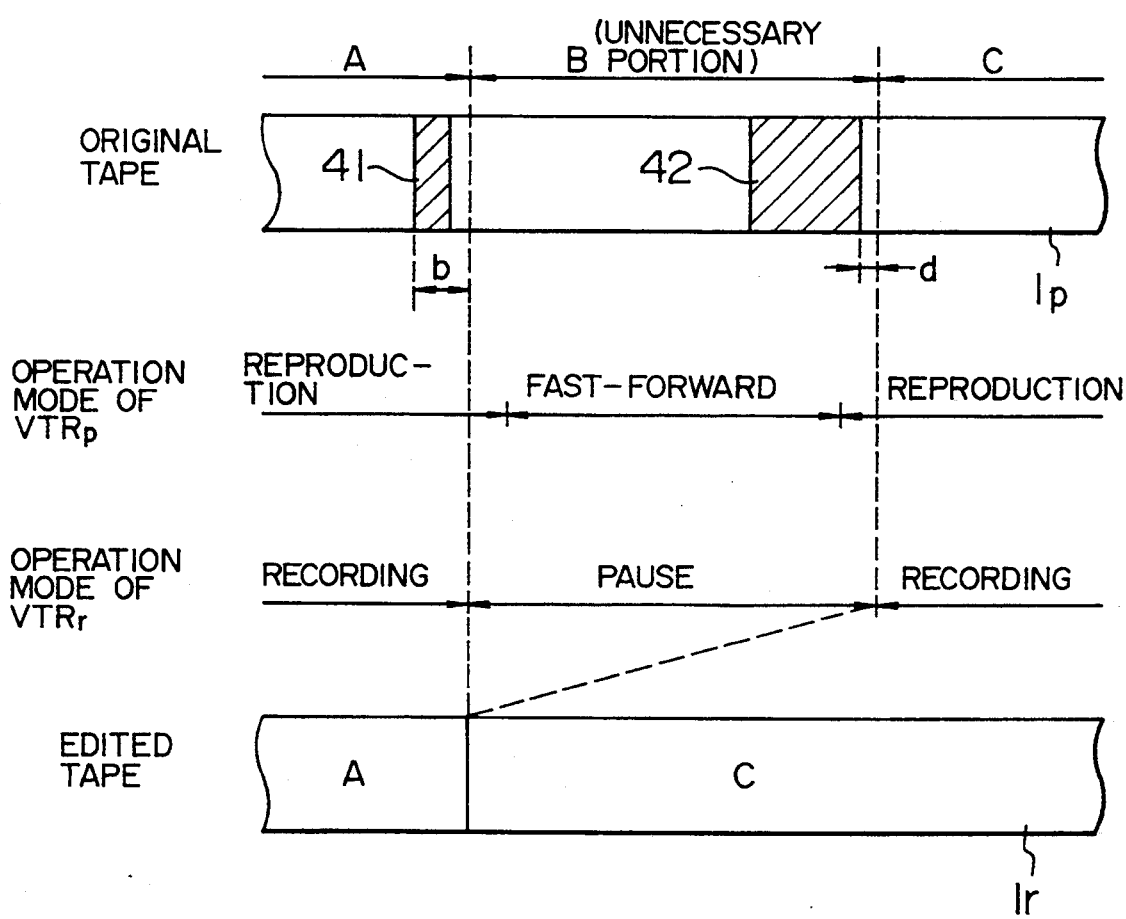

MAGNETIC TAPE RECORDING/REPRODUCING APPARATUS HAVING AUTOMATIC MODE CONTROL

BACKGROUND OF THE INVENTION

The present invention relates to a magnetic recording/reproducing apparatus which forms on a magnetic tape an information recording area apart from recording areas for a video signal and an audio signal.

In general, as a method for removing unnecessary signal portions (for example, a commercial portion) from signals to be recorded by a magnetic recording/reproducing apparatus (hereinafter referred to as the VTR), such unnecessary signal portions are inhibited from being recorded. With this method, however, the user must operate the VTR each time an unnecessary signal portion appears during a recording operation. This method may also cause the user to make mistakes, e.g., forgetting to record necessary portions.

To avoid such mistakes, conventionally, all signals, including unnecessary portions, are in many cases recorded, and an operation such as a search is performed upon reproducing the signals by a VTR each time an unnecessary portion is to be skipped. This method takes much time and labor.

As one of the methods to solve the above-mentioned problems, as described in JP-A-59-221851, a technique for a VTR has been proposed in which an information signal is recorded together with a video signal such that an operation mode such as a search is automatically controlled by the recorded information signal. Specifically, the operation mode of the VTR is controlled in accordance with particular bit pattern information of an ID signal in a PCM audio signal. This technique is based on the idea that time information, a field number, stereo/monaural discrimination information and so on, conventionally written on a magnetic tape, are not always necessary. Although this prior art allows the user to control the operation of the VTR without giving the user trouble, since an information signal is recorded together with a PCM audio signal in a PCM audio region, the PCM audio signal must be processed together every time the user is to execute so-called after-recording, i.e., an operation for recording an information signal after a video signal has been recorded, erasure, re-recording and so on. Also, the information signal, since recorded in the PCM audio area, cannot be commonly used with time information and other information such as a field number.

To cope with the above-mentioned problem, a technique, as described in JA-A-64-79990, has been proposed where an information signal recording area is formed in part of a slant track with respect to the longitudinal direction of the tape where neither a video signal nor an audio signal is recorded, and data for editing, as well as a time code and so on, are recorded in this information signal recording area. Since the data for editing is recorded in an area separate from areas for recording video and audio signals, this prior art permits the user to after-record such data for editing.

However, as the second prior art technique requires a program created for specifying an operation mode of a VTR at a particular tape position to be recorded at the beginning of a tape, the creation and recording of the program takes much time and labor. Also, if reproduction is started from a midway point of a tape, the VTR cannot read data for editing, whereby the specified operation is not performed by the VTR. Further, since the data for editing must be temporarily stored in an editor, the editor needs a memory and its control circuit, and accordingly becomes very expensive.

Although the foregoing first prior art does not give rise to an inconvenience even if reproduction is started from a midway point of a magnetic tape since a particular bit pattern is recorded at a position where the operation of a VTR is to be switched, the particular bit pattern alone cannot be after-recorded as described above. In addition, this prior art does not indicate specific procedures for recording and reproducing the particular bit pattern and thus fails to consider the operability of the VTR.

It will be understood by those skilled in the art that reading of the information signal for search and fast-forward operations is the first to be considered. Specifically explaining, when a magnetic tape is transported at a high speed during such operations, magnetic heads obliquely scan a plurality of tracks at intervals, as is well known in the art. For this reason, the magnetic heads may not scan a track including an area in which an information signal is written, whereby the operation of the VTR is possibly hindered. To cope with this problem, it has been proposed to record the same information on a plurality of tracks. However, the above-mentioned prior art does not indicate specific means for doing this. Such recording of the same information on a plurality of tracks, however, is not preferable from a viewpoint of effective utilization of a recording area on a magnetic tape. Generally, in a search or fast-forward operation which need not read the information signal, the number of tracks on which the same information is recorded should be as small as possible. The prior art does not consider in which mode information is read, and accordingly gives rise to a problem with respect to effective utilization of a recording area.

In addition, when another information signal indicating an operation mode or the like is to be after-recorded on a magnetic tape on which an information signal including sequential information such as a time code has been written upon recording a video signal, the previously recorded sequential information such as the time code is erased by the after-recording operation.

Since the operation of the VTR is controlled after an information signal is read from a running magnetic tape, a time lag from the reading of the information signal to the start of the control and the influence of inertia caused by the tape-cylinder system give rise to a problem that a requested operation is started from a position of a tape slightly advanced from the desired position. This problem is grave, particularly when a still reproduction is specified, because a slight deviation of track may result in reproducing a completely different video signal.

When an information signal alone is to be re-recorded, for example, because of a positional error of recording, if the recorded position of the information signal is not known, erroneous operation may occur due to a failure of erasure or an incomplete erasure of the information signal.

SUMMARY OF THE INVENTION

It is a first object of the present invention to provide a magnetic recording/reproducing apparatus for solving the above-mentioned problems, which is capable of readily performing automatic switching of operation modes.

It is a second object of the present invention to provide a magnetic recording/reproducing apparatus which is capable of protecting previously recorded sequential information, such as a time code, from being lost even if an information signal for specifying an operation mode (hereinafter referred to as the operation code) is after-recorded.

It is a third object of the present invention to provide a magnetic recording/reproducing apparatus which is capable of highly accurately performing an operation requested by the user at a requested position.

It is a fourth object of the present invention to provide a magnetic recording/reproducing apparatus which informs the user of positions on which operation codes are recorded, to facilitate erasure of unnecessary operation codes.

It is a fifth object of the present invention to provide an editing system and a magnetic recording/reproducing apparatus manufactured at a lost cost, which are capable of readily removing unnecessary portions.

To achieve the above objects, the present invention provides a magnetic recording apparatus comprising:

recording means for recording an information signal, different from a video signal or an audio signal, in an information signal recording area in an extended portion of a slant track formed on a magnetic tape by rotary heads as a recording area for the video signal or the audio signal;

operation code generating means for generating an operation code which determines an operating state of the magnetic recording apparatus;

means for supplying the recording means with the operation code as the information signal;

recording area setting means for determining a position on the magnetic tape at which the operation code is recorded by the recording means; and control means for recording the operation code by the recording means at the position on the magnetic tape determined by the recording area setting means, whereby a desired operation code is recorded at a desired position on the magnetic tape. As a result, a reproducing system, by detecting a reproduced operation code, can set the reproducing system itself and another apparatus connected to the reproducing system in an operation state specified by the reproduced operation code.

BRIEF DESCRIPTION OF THE DRAWINGS

FIG. 16 is a timing chart illustrating the contents recorded on respective tapes and operating states of VTRs according to the seventh embodiment;

FIG. 18 is a timing chart illustrating the contents recorded on respective tapes and operating states of VTRs according to the eighth embodiment.

DESCRIPTION OF THE PREFERRED EMBODIMENTS

A first embodiment of the present invention will hereinafter be described with reference to FIG. 1.

Figure 1:
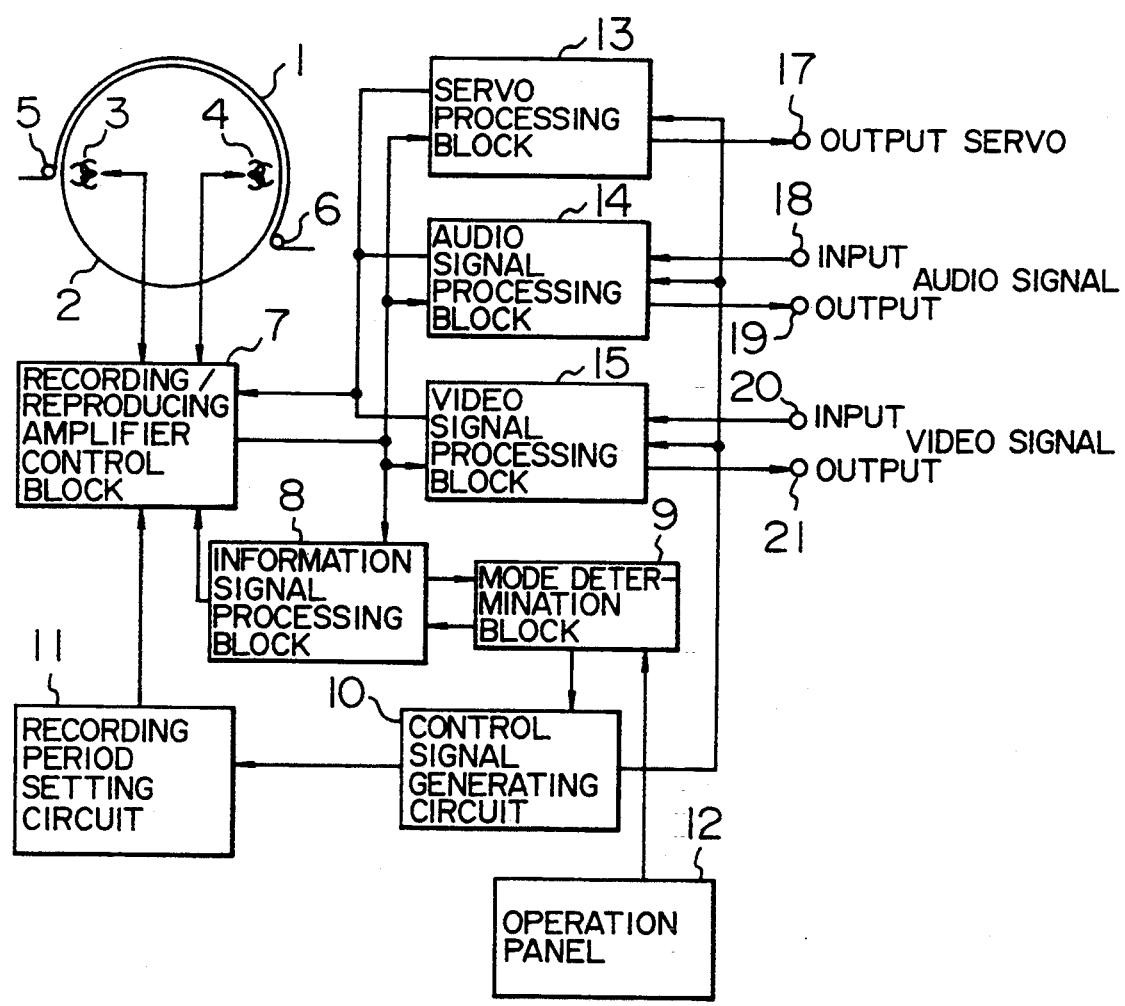
FIG. 1 is a block diagram illustrating a first embodiment of the present invention.

FIG. 1 illustrates in a block form a VTR, for the so-called 8-mm video signal format, to which the present invention is applied.

The VTR shown in FIG. 1 comprises a rotary cylinder 2; rotary magnetic heads 3 and 4; magnetic tape guides 5 and 6 for guiding a magnetic tape 1 around rotary cylinder 2 and past magnetic heads 3 and 4; a recording/reproducing amplifier control block 7 including a recording amplifier, a reproducing amplifier and a control circuit therefor; an information signal processing block 8 for generating, recording and reproducing an information signal, including generation and reading of a time code; a mode determination block 9 for determining a mode from an inputted signal; a control signal generating block 10; a recording period setting circuit 11 for controlling a recording period of an information signal; an operation panel 12; a servo recording/reproducing processing block 13; an audio processing block for recording and reproducing an audio signal 14; a video signal processing block for recording and reproducing a video signal 15; a servo output terminal 17; an audio signal input terminal 18; an audio signal output terminal 19; a video signal input terminal 20; and a video signal output terminal 21.

A recording operation of the VTR shown in FIG. 1 will be next explained.

When a recording operation is instructed through the operation panel 12 by the user, the mode determination block 9 determines the instructed operation and generates a mode signal indicative of a recording mode which is supplied to the information signal processing block 8. The information signal processing block 8, upon receiving the mode signal indicative of the recording mode, encodes a time code and date/time information generated in the block 8, modulates the encoded information and then supplies the modulated information to the recording/reproducing amplifier control block 7.

The recording of the information signal is performed in conformity with the standard of 8-bit PCM signals for the 8-mm VTR. Specifically, the information signal is modulated by a bi-phase mark method and recorded at a recording bit rate of 5.79 MHz. Error detection is carried out by a CRC (Cyclic Redundancy Check) method.

The encoding of the information signal, such as the time code, a recording area and a recording method, are described in detail in the foregoing prior art, i.e., JP-A-64-79990, and so explanation thereof will be omitted here.

The control signal generating block 10 receives the mode signal indicative of the recording mode from the mode determination block 9 and generates control signals to have the servo processing block 13, the audio signal processing block 14 and the video signal processing block 15 perform the recording operation.

The servo processing block 13 generates a pilot signal for tracking which is supplied to the recording/reproducing amplifier control block 7.

An audio signal inputted through the audio signal input terminal 18 is FM-modulated by the audio signal processing block 14 and outputted as an FM audio signal.

A video signal inputted through the video signal input terminal 20 is separated into a luminance signal and a chrominance signal by the video signal processing block 15. The luminance signal is subjected to a recording processing such as FM-modulation, while the chrominance signal is converted to a signal at a lower frequency range by a frequency conversion, again synthesized with the luminance signal, and then outputted. The pilot signal, the FM audio signal, and the video signal, after being subjected to the recording processing, are synthesized by a frequency multiplex method, amplified by the recording/reproducing amplifier control block 7, and then recorded on a magnetic tape 1 through the rotary magnetic heads 3, 4.

Next, description will be made as to the operation of the VTR shown in FIG. 1 when an information signal is after-recorded.

In an information signal after-recording mode for after-recording an information signal, a pilot signal for tracking, an audio signal and a video signal are read from the magnetic tape 1 by the rotary magnetic heads 3, 4, sufficiently amplified by the recording/reproducing amplifier control block 7, and then supplied to the servo processing block 13, the audio signal processing block 14 and the video signal processing block 15, respectively.

The servo processing block 13 performs processing, such as amplification and comparison of pilot signals recorded on adjacent tracks, and generates a control signal at the servo output terminal 17. Based on this control signal, a capstan motor is controlled, for example, to rotate in an accelerating direction or in a decelerating direction.

The audio signal processing block 14 FM-demodulates the supplied signal and outputs the demodulated audio signal via the audio signal output terminal 19.

The video signal processing block 15 separates the inputted video signal into a luminance signal and a chrominance signal. The luminance signal is subjected to reproduction processing, such as FM demodulation, while the chrominance signal is re-converted to a high frequency range by a frequency conversion, synthesized with the luminance signal, and outputted through the video signal output terminal 21.

The user of the VTR monitors the video signal outputted from the video signal output terminal 21 and instructs through the operation panel 12 to after-record a fast-forward signal when an unnecessary video signal portion (for example, a commercial) begins. The mode determining block 9 determines from this operation a mode for after-recording the fast-forward signal and generates a mode signal indicative thereof which is supplied to the information signal processing block 8 and the control signal generating circuit 10. The information signal processing block 8, upon receiving this mode signal, generates an operation code (for example, "10100010") corresponding to a fast-forward operation. Assuming, for example, that a period of eight fields has been set by the recording period setting circuit 11, the operation code is recorded for the period of eight fields through the recording/reproducing amplifier control block 7 and the rotary magnetic heads 3, 4 in an information signal recording area, later referred to, on the magnetic tape 1.

A recording period is set by the user who inputs through the operation panel 12 a recording period considered necessary. The mode determination block 9 determines from this input operation of the user a mode for setting a recording period. Then, the control signal generating block 10, in conformity with this determination result, generates a signal for setting the inputted recording period which is supplied to the recording period setting circuit 11.

Figure 2:
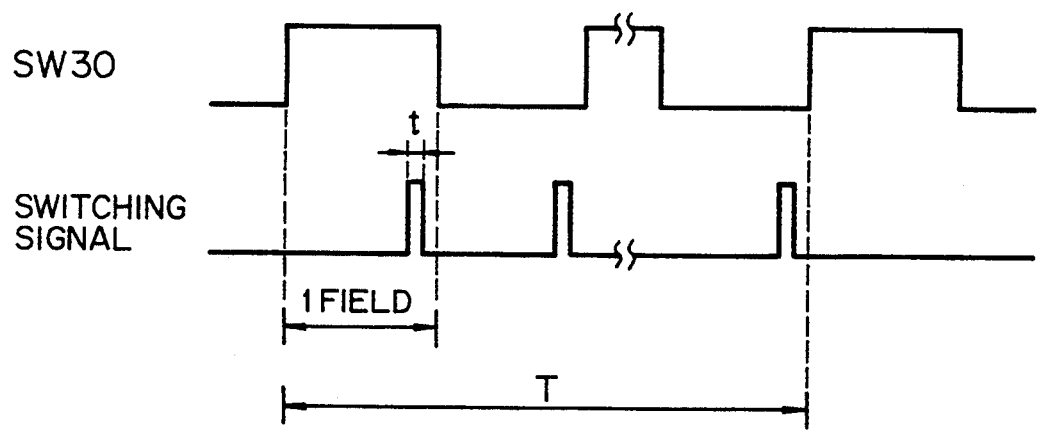
FIG. 2 is a waveform chart illustrating a switching signal in an after-recording operation.

Next, the operation of the recording/reproducing amplifier control block 7 in an after-recording operation will be described with reference to FIG. 2. When a switching signal is at high level, the recording/reproducing amplifier control block 7 is set in a recording state where it amplifies an information signal and supplies the amplified information signal to the rotary magnetic heads 3, 4. In FIG. 2, the information signal is recorded for a period designated by t in one field. On the other hand, when the switching signal is at low level, the recording/reproducing amplifier control block 7 is set in a reproducing state where it sufficiently amplifies a pilot signal, a video signal and an audio signal and supplies them to the servo processing block 13, the audio signal processing block 14 and the video signal processing block 15, respectively. A period designated by T corresponds to the above-mentioned information signal recording period.

When the unnecessary portion of the video signal outputted from the video signal output terminal 21 is terminated and a necessary portion (for example, a movie) begins, the operator instructs through the operation panel 12 to after-record a signal indicative of normal reproduction. The mode determination block 9 determines a mode for after-recording the signal indicative of normal reproduction and supplies a mode signal corresponding thereto to the information signal processing block 8 and the control signal generating circuit 10. At this time, the information signal processing block 8 generates an operation code corresponding to the normal reproduction (for example, "00000010"). For a period of, for example, 10 seconds (T=10 seconds in FIG. 2), set by the recording period setting circuit 11, the operation code is recorded in the information recording area, later referred to, on the magnetic tape 1 through the recording/reproducing amplifier control block 7 and the rotary magnetic heads 3, 4.

During this period necessary to record the information signal, an instruction inputted by the user through the operation panel 12 is not accepted. Whereas, such an input through the operation panel 12 has priority out of the period necessary to record the information signal.

Figure 3:
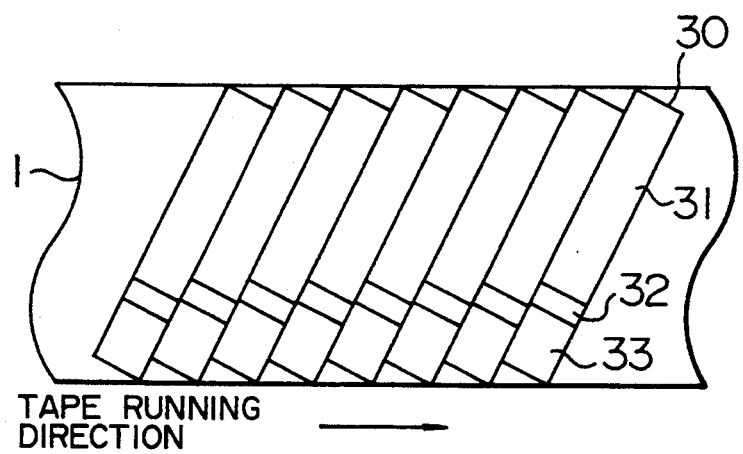
FIG. 3 is a pattern diagram illustrating an example of a format on a magnetic tape.

FIG. 3 illustrates a concept of a format formed on the magnetic tape 1 by the VTR shown in FIG. 1. On each track 30 obliquely recorded on the magnetic tape 1, the information signal is written in an information signal area 32 sandwiched by a video signal area 31 and a PCM audio signal area 33.

Figures 4, 5:
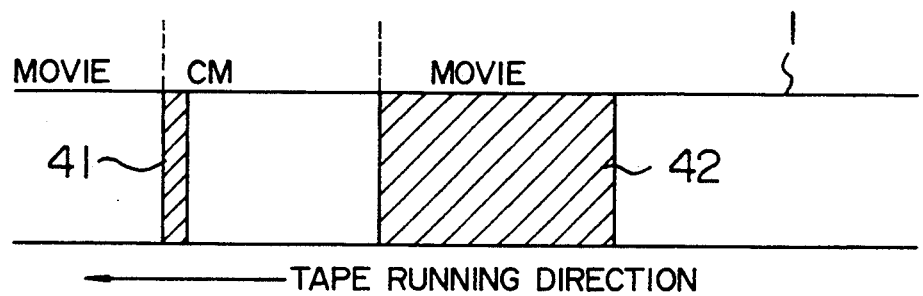
FIG. 4 is a diagram illustrating a concept of an information signal recording period.
FIG. 5 is a table showing bit patterns of information signals, and operation modes corresponding thereto.

FIG. 4 schematically illustrates the magnetic tape 1 on which the foregoing after-recording has been performed. Note that in FIG. 4 a track pattern as shown in FIG. 3 is omitted and hatched portions indicate periods in which information was after-recorded in the information signal area 32 of FIG. 3.

An information signal indicative of a fast-forward operation (for example, "10100010") is recorded for a recording period 41 (for example eight fields) at a position from which a movie recorded portion changes to a commercial recorded portion. Further, an information signal indicative of a normal reproduction (for example, "00000010") is recorded for a recording period 42 (for example 10 seconds) at a position from which the commercial recorded portion is terminated and the movie is again recorded.

Next, description will be made as to the operation of the VTR shown in FIG. 1 when reproduction is performed.

Referring to FIG. 1, the signals recorded on the magnetic tape 12 are picked up through the magnetic heads 3, 4 and are sufficiently amplified by the recording/reproducing amplifier control block 7 and supplied to the servo processing block 13, the audio signal processing block 14, the video signal processing block 15 and the information signal processing block 8, respectively.

In the servo processing block 13, pilot signal recorded on adjacent tracks, after being amplified, are compared with each other. Then, a control signal is applied to the servo output terminal 17 in accordance with the comparison result for controlling the capstan motor in the accelerating direction or in the decelerating direction.

The audio signal processing block 14 FM-demodulates the supplied signal and outputs the demodulated audio signal from the audio signal output terminal 19.

The video signal processing block 15 separates the inputted video signal into a luminance signal and a chrominance signal. The luminance signal is subjected to reproduction processing such as FM demodulation, while the chrominance signal is re-converted to a high frequency range by a frequency conversion, synthesized with the luminance signal, and outputted through the video signal output terminal 21.

After the information signal processing block 8 performs processing such as error correction for the supplied information signal, the information signal is supplied to the mode determination block 9. Assuming that the information signal supplied to the mode determination block 9 has a bit pattern of, for example, "10100010" and the mode determination block 9 determines a fast-forward mode, a control signal for fast-forwarding the magnetic tape 1 is supplied from the control signal generating block 10 to the servo processing block 13 which responsively instructs a servo system and so on to perform the fast-forward operation through the servo output terminal 17. By the control signal generated by the control signal generating block 10, the audio signal processing block 14, and the video signal processing block 15 operate so as to mute the audio output and the video output, respectively, during the fast-forward operation.

Assuming next that the information signal supplied to the mode determination block 9 has a bit pattern of, for example, "00000010" and the mode determination block 9 determines a normal reproduction mode, an instruction of normal reproduction is supplied to the control signal generating block 10. The control signal generating block 10 supplies a control signal for performing normal reproduction to the servo processing block 13 which responsively instructs a servo system and so on to perform the normal reproducing operation through the servo output terminal 17.

When the VTR performs a rewinding operation, an information signal for controlling the operation mode is read, but an operation indicated by the information signal is not performed.

The information signals, each having eight bits of information, are respectively recorded in areas WORD-0–WORD4, as described in the foregoing prior art JA-A-64-79990. Recorded in WORD0 is an ID code for identifying the information signal as one for controlling the operation mode. WORD1 contains the operation mode, such as the fast-forward and normal reproduction modes. The foregoing bit pattern examples refer to WORD1. WORD2 indicates a still reproducing time; WORD3 the frequency of repetitions for a repeated reproduction mode; and WORD4 information indicating a search of previous X fields, later referred to.

FIG. 5 shows the information signal recorded in WORD1 and operation modes corresponding thereto.

By the first embodiment described above, necessary portions alone can be normally reproduced, while unnecessary portions are fast-forwarded without giving the user any trouble.

When the VTR is reproducing in a normal mode (for example, a movie) and the VTR reads an operation code indicative of an unnecessary portion (for example, a commercial), the information signal can be read in a short period, and so a recording period is set, for example, to eight fields. In contrast, when the VTR is operating in the fast-forward mode in which the recording heads 3, 4 obliquely scan tracks at intervals and the VTR reads an operation code recorded at a position where the unnecessary or commercial portion is terminated and the movie portion begins, the information signal is read with a lower efficiency. It is therefore necessary to provide a longer period for recording the information signal in the fast-forward mode. Thus, the recording period of the information signal is varied by the recording period setting circuit 11, such that the information signal is recorded, and in the fast-forward mode it is set, for example, to 10 seconds. Since it is possible to adjust the recording period in accordance with the tape speed, the interval in which the time code and date/time are omitted is reduced, and so a reading error does not occur.

Although in the first embodiment, the mode determination block 9, the control signal generating block 10 and the recording setting circuit 11 are implemented by hardware, these components can also be implemented by software.

Next, a second embodiment of the present invention will be described with reference to FIG. 6.

Figure 6:
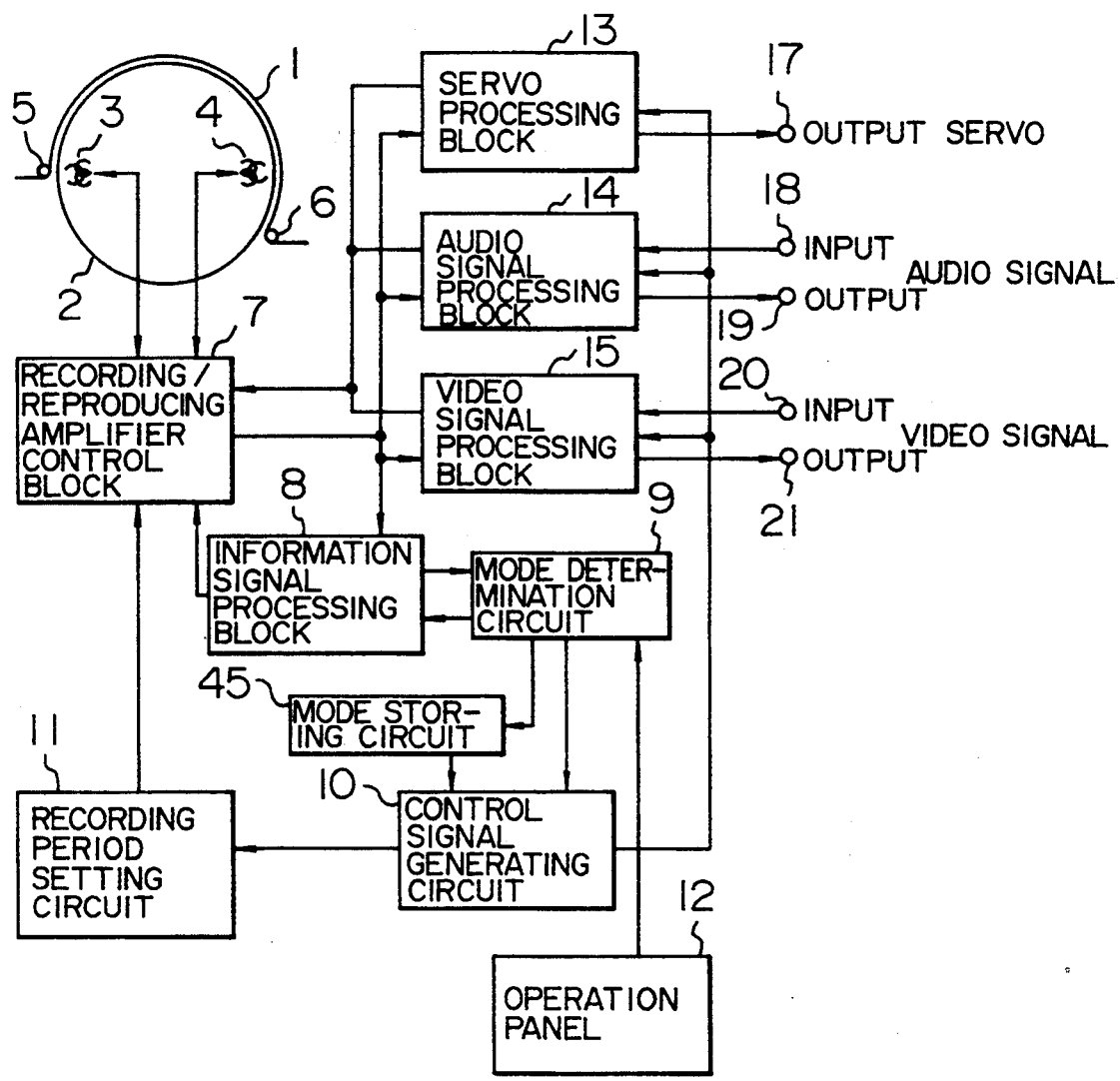
FIG. 6 is a block diagram illustrating a second embodiment of the present invention.

FIG. 6 illustrates in a block form a VTR for the 8-mm video signal format, where a mode storing circuit 45 is added to the configuration shown in FIG. 1. Parts in FIG. 6 corresponding to those in FIG. 1 are designated by the same reference numerals, and repetitive explanation thereof will be omitted.

The operation performed by the VTR of FIG. 6 in the recording mode is similar to that of the first embodiment. Therefore, the operation in the after-recording mode will be described in connection with FIG. 6.

The user of the VTR monitors a video signal outputted from a video signal output terminal 21 and instructs through an operation panel 12 to after-record a fast-forward signal when an unnecessary video signal portion (for example, a commercial) begins. At this time, in addition to recording an information signal in an information signal area on a magnetic tape by an operation similar to that of the first embodiment, mode determination block 9 determines a fast-forward mode corresponding to the information signal inputted from the operation panel 12 and stores a digital signal (for example, "10100010") outputted therefrom in the mode storing circuit 45.

Next, when the unnecessary video signal portion is terminated and a necessary portion (for example, a movie portion) begins, the user instructs through the operation panel 12 to after-record a signal indicative of normal reproduction. The mode determination block 9 then determines a mode for after-recording the normal reproduction indicating signal and supplies a mode signal corresponding thereto to information signal processing block 8 and control signal generating circuit 10. At this time, the information signal processing block 8 generates a digital signal corresponding to the normal reproduction (for example, "00000010") which is recorded in an information signal area on the magnetic tape 1 through recording/reproducing amplifier control block 7 and rotary magnetic heads 3, 4 for a period of 10 seconds, which has been automatically set in the recording period setting circuit 11 by a method explained below.

When an instruction to record an information signal is inputted by the user through the operation panel 12, the mode storing circuit 45 supplies the stored signal to the control signal generating block 10. In response to the inputted signal corresponding to the fast-forward mode, the control signal generating block 10 automatically sets an information signal recording period to, for example, 10 seconds by the recording period setting circuit 11.

When a signal corresponding to the normal reproduction mode is supplied to the control signal generating block 10 from the mode storing circuit 45, the information signal recording period is set by the recording period setting circuit 11 to, for example, eight fields during which the information signal is after-recorded.

The operation of the VTR according to the second embodiment in the reproduction mode is similar to that of the first embodiment.

An operation mode signal stored in the mode storing circuit 45 is reset when power is turned on or off, or when a cassette is ejected, and indicates an initial value (for example, "00000010" indicative of the normal reproduction mode). When a value supplied to the control signal generating block 10 indicates the initial value, the control signal generating block 10 sets the same recording period as that when the signal indicative of the normal reproduction mode is inputted, and the recording period is determined by the recording period setting circuit 11.

The operation of the VTR when reading an information signal corresponds to the previously recorded information signal for controlling the operation mode. In the second embodiment, the information signal recording period is automatically set by the recording period setting circuit 11 based on a control signal generated by the control signal generating block 10 in accordance with an operation mode indicated by an information signal stored in the mode storing circuit 45. It is therefore possible to accomplish the same effects as those produced by the first embodiment with improved operability.

Although in the second embodiment, the mode storing circuit 45 is implemented by hardware, it may also be implemented by software.

Next, a third embodiment of the present invention will be described with reference to FIG. 7.

Figure 7:
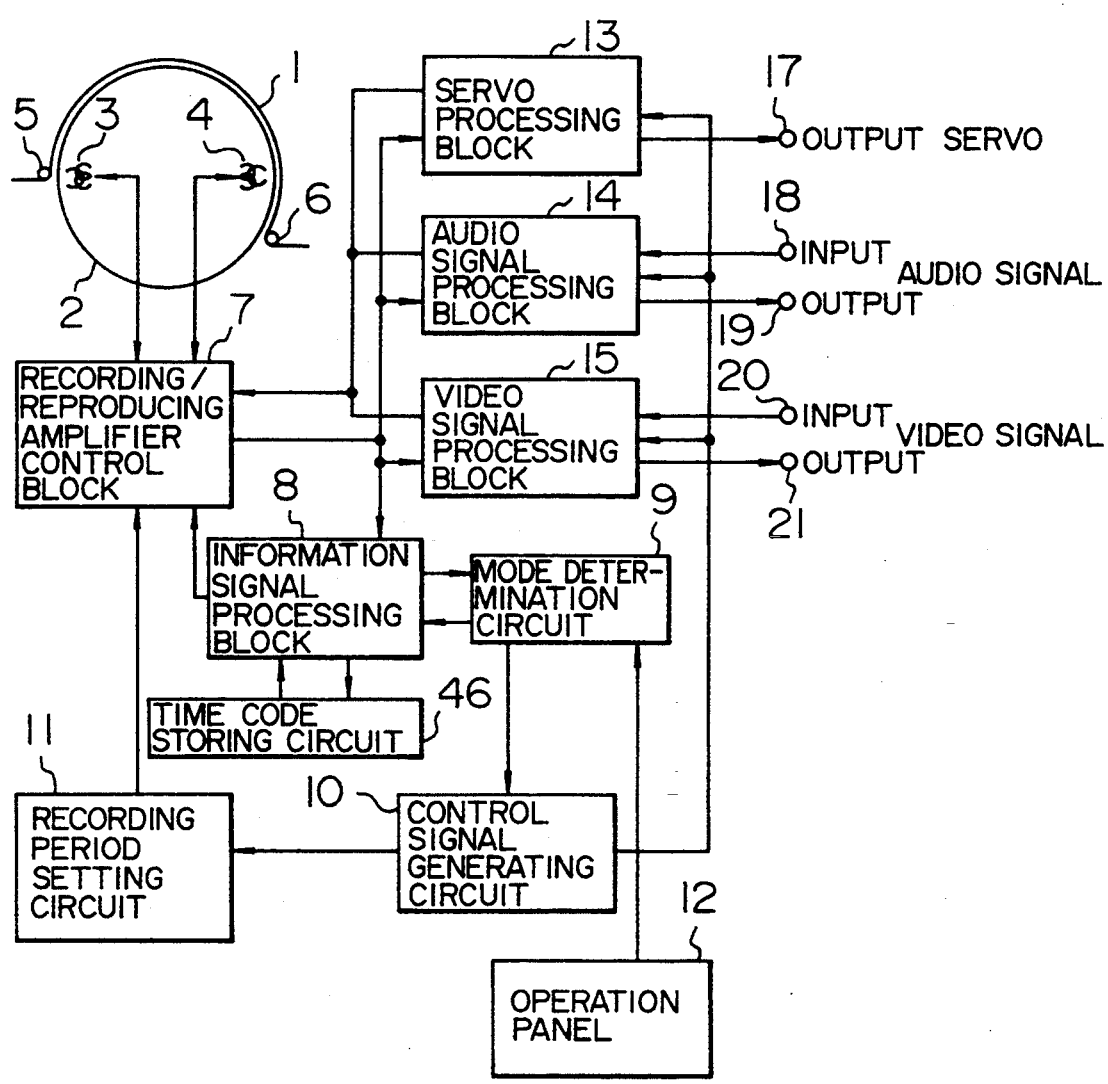
FIG. 7 is a block diagram illustrating a third embodiment of the present invention.

FIG. 7 illustrates in a block form a VTR for the 8-mm video signal format where a time code storing circuit 46 is added to the configuration shown in FIG. 1. Parts in FIG. 7 corresponding to those in FIG. 1 are designated by the same reference numerals, and repetitive explanation thereof will be omitted.

The operation of the VTR shown in FIG. 7 in the recording mode is the same as that of the first embodiment shown in FIG. 1. In a reproducing operation, when an after-recording is not instructed by information signal processing block 8, a time code written on a magnetic tape 1 upon recording is reproduced, together with a video signal and an audio signal. The latest time code read by the information signal processing block 8 is stored in the time code storing circuit 46.

When the information signal processing block 8 after-records an operation code in an information signal area in response to an instruction supplied thereto from operation panel 12 through mode determination block 9, the information signal processing block 8 newly generates a time code so as to be sequential to the latest time code stored in the time code storing circuit 46. This time code is recorded together with the operation code in a time division manner.

Figure 8:
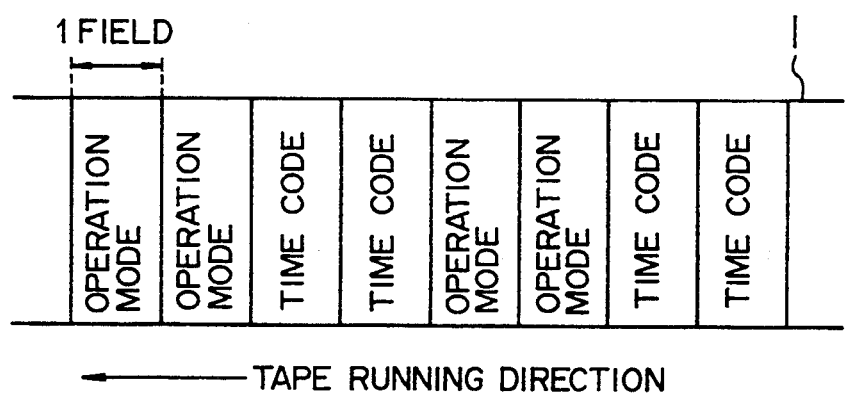
FIG. 8 is a diagram conceptually illustrating an example of time codes recorded on a magnetic tape.

FIG. 8 illustrates an example of a time-division recording of the time codes and the operation codes. As shown in FIG. 8, two-field portions of the time codes and the operation codes are alternately recorded on the magnetic tape 1. It should be noted in FIG. 8 that the track pattern shown in FIG. 3 is omitted, and a portion corresponding to the information signal area 32 shown in FIG. 3 alone is illustrated.

Generally, when an information signal is after-recorded, a time code previously written in an information recording area on the magnetic tape 1 is erased. However, in the third embodiment, since the time code is after-recorded together with the operation code by the information signal processing block 8 so as to be sequential to the latest time code stored in the time code storing circuit 46, even if an information signal is after-recorded, the previously recorded time code is not lost.

Although in the third embodiment, the time code storing circuit 46 was implemented by hardware, it may also be implemented by software.

Next, description will be made as to a fourth embodiment of the present invention which is suitable for use in still image reproduction. The configuration of a VTR according to the fourth embodiment is similar to the configuration shown in FIG. 1, 6 or 7. While the operation of the VTR of the fourth embodiment for recording a video signal and an audio signal is the same as that of the foregoing embodiments, mode determination circuit 9 in after-recording and reproduction modes operates in conformity with a flow chart shown in FIG. 9.

Figure 9:
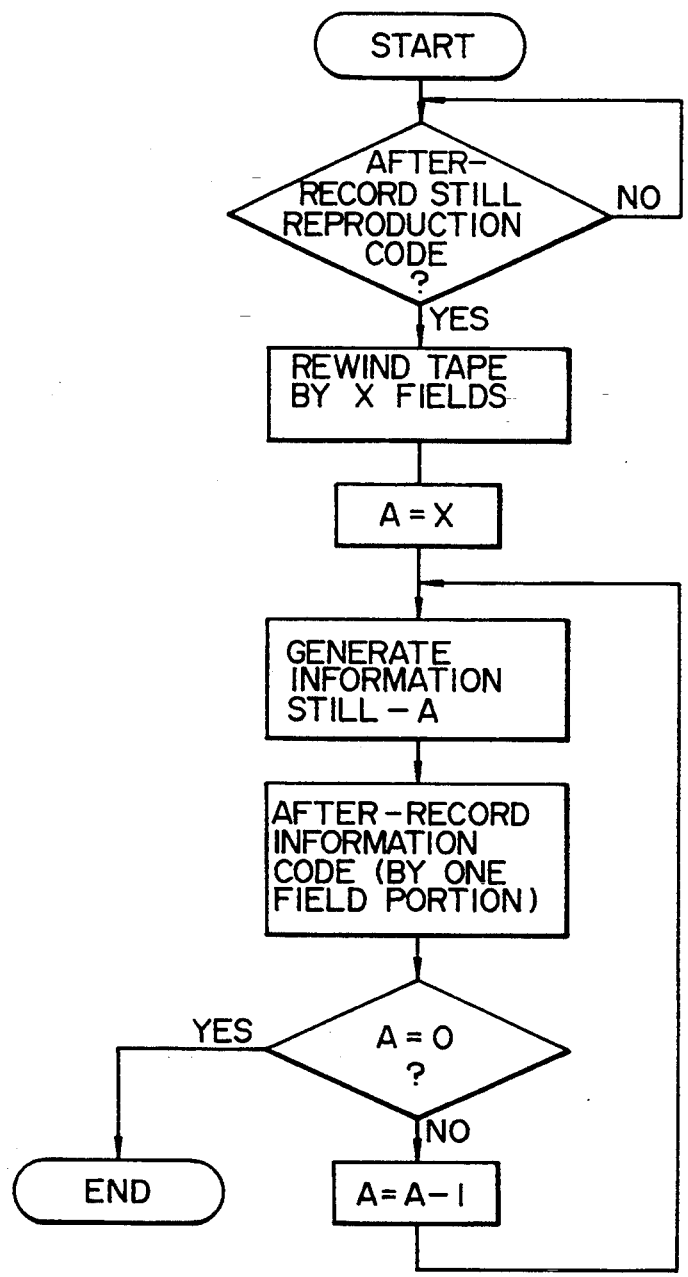
FIG. 9 is a flow chart illustrating a fourth embodiment of the present invention.

FIG. 9 illustrates an algorithm of the operation performed by the mode determination circuit 9 in a still signal after-recording mode. When the user instructs through operation panel 12 to after-record a still signal, the mode determination circuit 9 supplies control signal generating circuit 10 with a control signal to control the VTR to rewind magnetic tape 1 by X fields. Next, information signal processing block 8 is controlled to generate an information signal indicating that the magnetic tape 1 is rewound to a position A fields prior to the still signal (this information signal is referred to as the still-A. Initially, A=X stands). Then, the control signal generating circuit 10 is supplied with a control signal so as to after-record this information signal on the magnetic tape 1. Following after-recording of the information signal over one field, the value A is decremented by one, and an information signal still-(X−1) is after-recorded. Subsequently, this information is after-recorded as the value A is decremented by one until it reaches zero.

Figure 10:
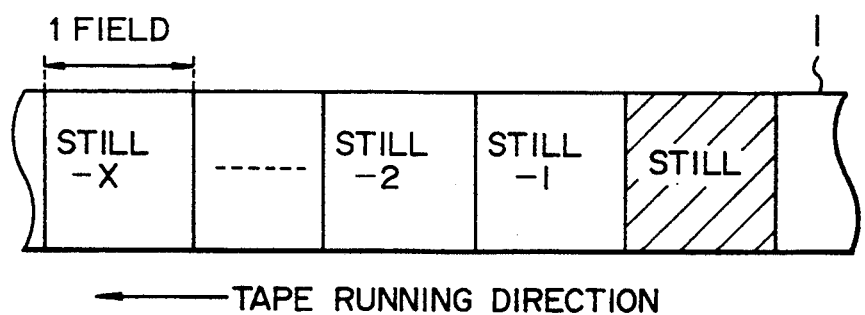
FIG. 10 is a diagram illustrating an example of signals recorded by the fourth embodiment.

FIG. 10 schematically illustrates the magnetic tape 1 on which the information signals are after-recorded by the above-mentioned operation, where the track pattern shown in FIG. 3 is omitted and a portion corresponding to the information signal area 32, shown in FIG. 3, alone is depicted.

During reproduction, the mode determination circuit 9 determines a position at which the still image is to be reproduced from the plurality of information signals (for example, still-5, still-4 and still-3) which are sequentially reproduced, and supplies a control signal at a predetermined time (for example, at the time of reproducing the information signal still-2) to the control signal generating circuit 10 such that the VTR reproduces the still signal. The VTR reproduces the still image over a hatched portion on the magnetic tape 1 after the lapse of a delay time (for example, a two-field portion) due to the delivery of the control signal and the inertia of the mechanism.

In this embodiment, since the information signals on still reproduction are recorded from a field of X fields (for example, X=5) prior to the field from which a still signal is to be reproduced, a still signal can be reproduced at a position desired by the user by correcting the deviation due to the time necessary to detect the information signals and deliver the control signal, and the inertia of the mechanism. Also, since still reproduction is determined by a plurality of information signals, it is possible to prevent an erroneous operation due to defective information possibly occurring in recording and reproducing operations. For example, if the information signal still-4 cannot be detected due to drop-out or the like, a still reproduction position is determined from the information signals still-5 and still-3.

Incidentally, this embodiment has been explained for the case where information signals are after-recorded in several fields prior to a field from which a still signal is reproduced. If information signals are also after-recorded in several fields after the still signal recorded field, it will be apparent that the still signal can be reproduced at a correct position also in reverse reproduction.

Next, a fifth embodiment of the present invention will be described with reference to FIG. 11.

Figure 11:
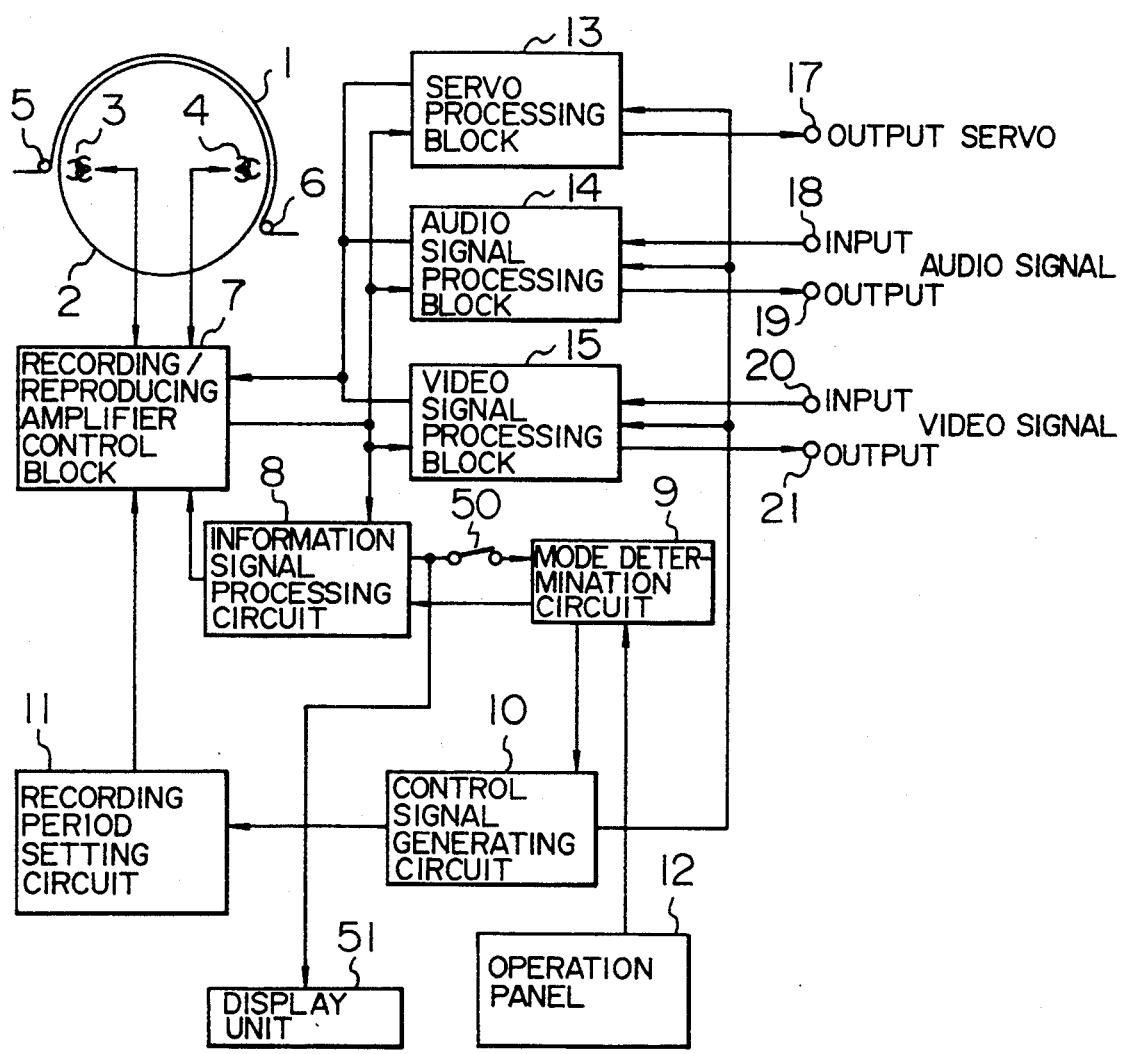
FIG. 11 is a block diagram illustrating a fifth embodiment of the present invention.

FIG. 11 is a block diagram of a VTR for the 8-mm video signal format, where a switch 50 and a recorded contents display unit 51 are added to the configuration shown in FIG. 1. Parts in FIG. 11 corresponding to those in FIG. 1 are designated by the same reference numerals, and so repetitive explanation thereof will be omitted.

First, description will be made, in connection with FIG. 11, as to the operation of the VTR when an operation code is erased during reproduction. Information signals recorded on magnetic tape 1 together with a video signal and an audio signal are reproduced by rotary magnetic heads 3, 4, sufficiently amplified by recording/reproducing amplifier control block 7, and then supplied to information signal processing block 8. When the information signals are erased, the switch 50 is turned off to prevent the information signal processing block 8 from supplying its output to mode determination circuit 9. When the reproducing system reads an information signal recorded on the magnetic tape 1, the information signal processing block 8 displays the contents of the read information signal (an operation mode indicated thereby) on the display unit 51.

Alternatively, it is also effective to only display on the display unit the fact that an information signal is recorded on the magnetic tape 1, without displaying the contents of the information signal.

The display unit 51 may continuously display the contents of a recorded information signal irrespective of whether the switch 50 is turned on or off.

If an operation code is displayed only in a short period (for example, eight fields) thought to be difficult for the user to view on the display, the display may be maintained for a predetermined period (for example, one second).

According to the fifth embodiment, an information signal recorded position is clarified by the display unit 51, thereby preventing an erroneous operation due to a failure to erase information signals or the like.

Also, if it is necessary to fail to perform an operation corresponding to an information signal, e.g., when an information signal is erased, the switch 50 is turned off to achieve the object.

Although the foregoing embodiments have been explained for VTRs for the 8-mm video signal format, the present invention is not limited to this type of VTR but is effective for a magnetic recording and reproducing apparatus which can write all information signals on a magnetic tape.

Also, the recording position of the information signal is not limitative, but may be recorded at any position on a magnetic tape or in a deep layer.

Next, an editing system according to the present invention will be described with reference to the accompanying drawings.

Figure 12:
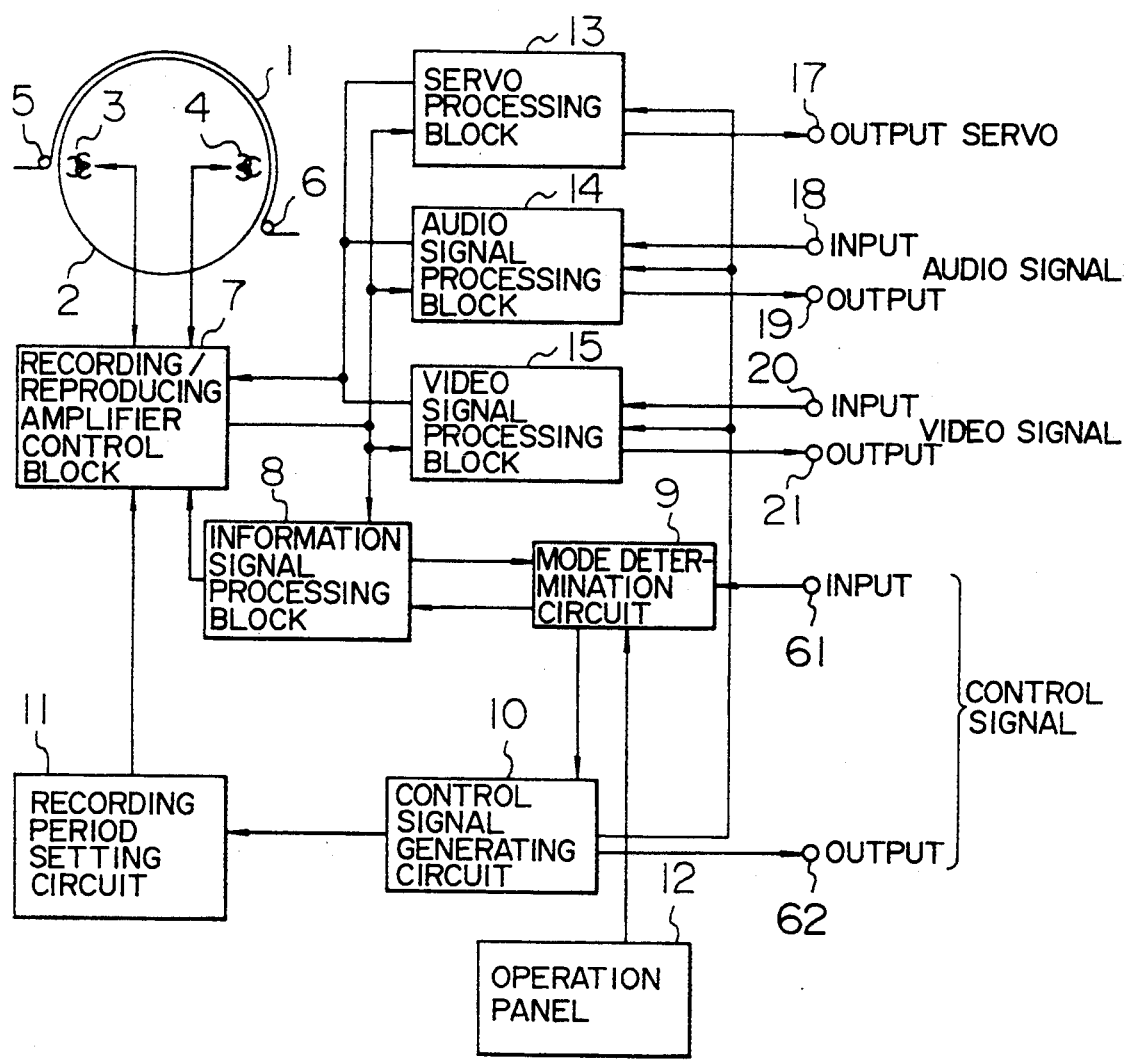
FIG. 12 is a block diagram illustrating a sixth embodiment of the present invention.

FIG. 12 illustrates in a block form a main portion of a VTR according to a sixth embodiment. The VTR shown in FIG. 12 includes a control signal input terminal 61 and a control signal output terminal 62, in addition to the configuration shown in FIG. 1. The rest of the configuration is common to the VTR shown in FIG. 1. Although the basic operations, such as recording, reproduction and after-recording, are performed in a manner similar to the VTR shown in FIG. 1, the VTR of this embodiment, upon reading an operation code during reproduction, not only switches its own operation mode, but also outputs a control signal for controlling an operation mode of another VTR from the control signal output terminal 62. Conversely, the VTR also receives a control signal from the other VTR through the control signal input terminal 61 to change the operation mode thereof.

Figure 13:
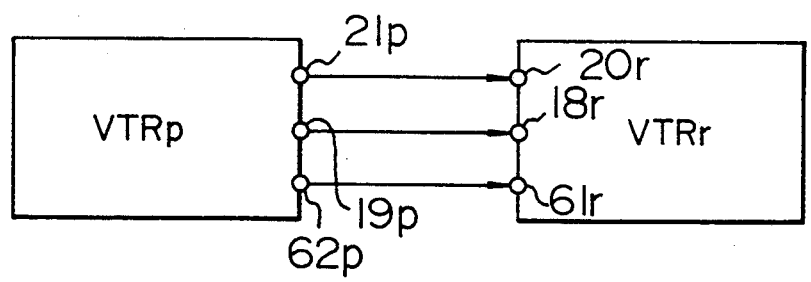
FIG. 13 is a block diagram illustrating an example of an editing system employing two VTRs.

Next, a procedure of performing a dubbing edit by using two sets of the VTR shown in FIG. 12 will be described with reference to FIG. 13. During an edit, a VTR on the reproduction side (hereinafter referred to as the VTRp, and reference numerals designating respective parts of which in FIG. 12 are suffixed "p") has a video signal output terminal 21p, an audio signal output terminal 19p and a control signal output terminal 62p respectively connected to a video signal input terminal 20r, an audio signal input terminal 18r and a control signal input terminal 61r or a VTR on the recording side (hereinafter referred to as the VTRr, and reference numerals designating respective part of which in FIG. 12 are suffixed "r").

Next, description will be made as to a procedure of only dubbing necessary portions of an original tape (generally called an assemble edit) by using the thus set editing system. Note that operation codes have been after-recorded on the original tape by the foregoing procedure.

Figure 14:
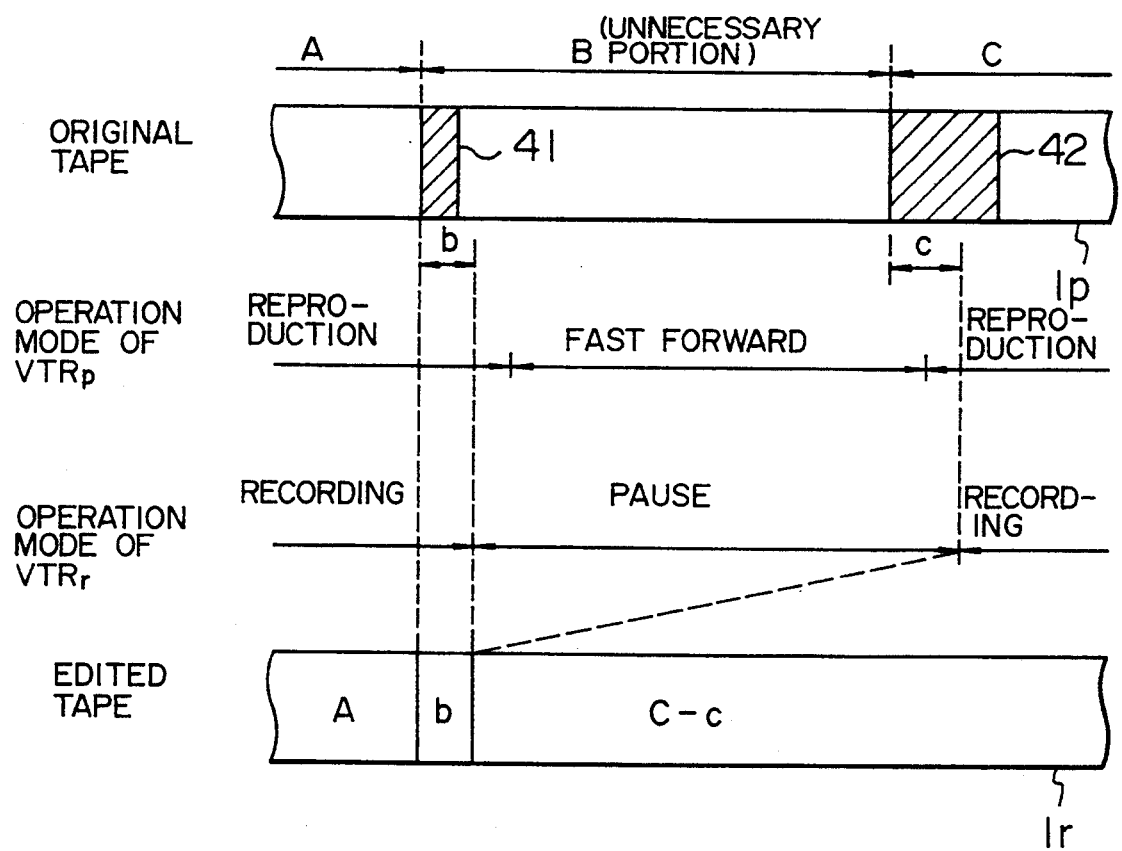
FIG. 14 is a timing chart illustrating contents recorded on respective tapes and operating states of the VTRs in the editing system shown in FIG. 13.

First, the user instructs through operation panel 12p of the VTRp to reproduce the original tape and simultaneously instructs through operation panel 12r of the VTRr to record on a blank tape video and audio signals reproduced from the original tape, whereby the video and audio signals recorded on the original tape are dubbed on the blank tape. When an unnecessary portion is reached, mode determination circuit 9p of the VTRp detects a fast-forward code and sends this information to control signal generating circuit 10p. The control signal generating circuit 10p generates a pause (temporary step) signal and sends the same through the control signal output terminal 62p. Mode determination circuit 9r of the VTRr receives the pause signal through the control signal input terminal 61r and sets the VTRr in a temporary recording stop state. The mode determination circuit 9p previously estimates the time intervening until the VTRr is set in the temporary recording stop state (designated t1) and sets the VTRp in a fast-forward mode after the time t1 from the detection of the fast-forward code. When a necessary portion of the original tape again begins after the unnecessary portion, the mode determination circuit 9p of the VTRp detects a normal reproduction code and sets the VTRp in a normal reproduction mode. The control signal generating circuit 10p previously estimates a time intervening until a reproduced signal is stably obtained from the VTRp (designated t2), and generates a pause releasing (recording resuming) signal after the time t2 from the detection of the normal reproduction code and outputs the same through the control signal output terminal 62p. The mode determination circuit 9r of the VTRr receives the pause releasing signal from the control signal input terminal 61r and sets the VTRr in a recording state. By the above-mentioned operation, only necessary portions of the original tape can be dubbed on the blank tape. FIG. 14 shows the operations of the VTRp and VTRr and the contents recorded on the edited tape corresponding to the contents recorded on the original tape.

According to the sixth embodiment, when an operation code is detected during a dubbing edit, the operations of the VTR on the reproduction side, as well as the VTR on the recording side, are automatically controlled so that an assemble edit can be automatically performed. Since the operation code is directly recorded on the magnetic tape 1, the VTR does not have to comprise a memory for storing positions of unnecessary video signal portions (corresponding to an editing program in the prior art). Also, even for interrupting operations for searching an unnecessary video signal portion and after-recording an operation code, it is not necessary to record data stored in a memory at a particular position (at the beginning) of a magnetic tape or, to the contrary, to store data recorded on the magnetic tape in the memory when the operation is resumed.

Incidentally, although in the sixth embodiment, a control signal is transferred from the control signal output terminal 62 to the control signal input terminal 61, it is apparent that similar effects can be produced by utilizing an infrared beam to remotely control operations such as a temporary recording stop.

Next, a seventh embodiment of the present invention will be described. As is apparent from FIG. 14, in the sixth embodiment, an initial portion b of an unnecessary portion B on the original tape 1p remains on the edited tape 1r, while an initial portion c of a necessary portion C is dropped. The portion b remains because the time for detecting a fast-forward code and the time for proceeding from the recording state to the temporary stop state are required before skipping the unnecessary portion B. On the other hand, the initial portion c is dropped because the time for detecting a normal reproduction code and the time for proceeding from the fast-forward state to the normal reproducing state are required before the necessary portion C is dubbed on the blank tape. Particularly, since the VTRp is operating in the fast-forward mode when detecting the normal reproduction code, a large amount of the original tape 1p is transported during the transition from the fast-forward state to the normal reproducing state, whereby the time converted from the dropped necessary portion c is longer than the time converted from the remaining unnecessary portion b.

Figure 15:
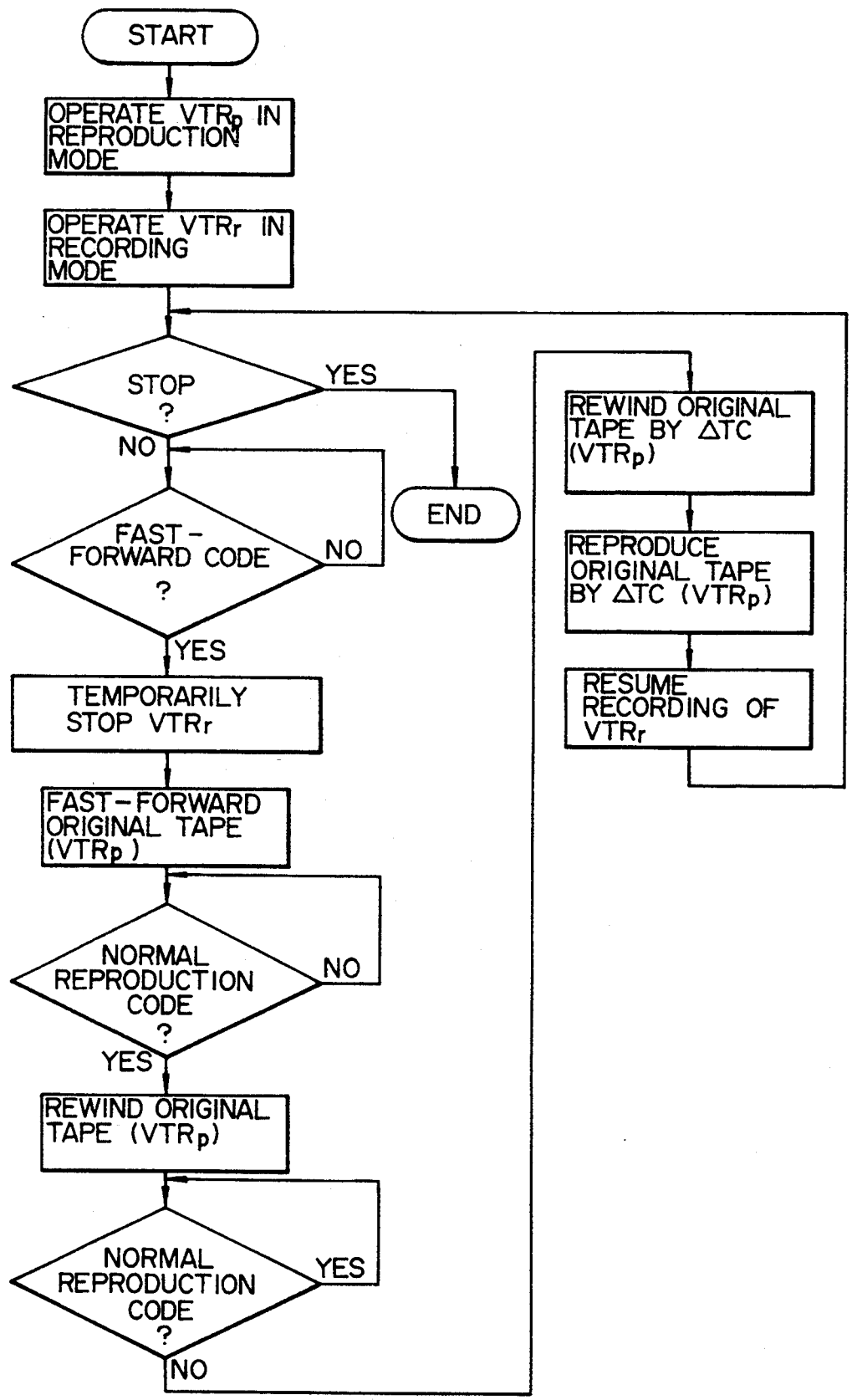
FIG. 15 is a flow chart illustrating a seventh embodiment of the present invention.

Therefore, the seventh embodiment prevents necessary portions from being dropped by an algorithm shown in FIG. 15. Note that the configurations of the VTR and the editing system of the seventh embodiment are the same as those shown in FIGS. 12 and 13, respectively. An algorithm of an editing operation will hereinafter be described in connection with FIG. 15. Initial steps are the same as those of the sixth embodiment. Specifically, VTRp and VTRr are set in reproducing and recording states, respectively (unless an instruction STOP is given from an operation panel 12p). When a mode determination circuit 9p detects a fast-forward code, this information is sent to control signal generating circuit 10p. By a control signal generated by the control signal generating circuit 10p, the VTRr is set in a temporary stop state, while the VTRp is made to fast-forward an original tape 1p. Afterward, when the mode determination circuit 9p detects a normal reproduction code, it supplies a control signal to the control signal generating circuit 10p so as to have the VTRp rewind the original tape 1p. Then, when the mode determination circuit 9p detects a position at which the normal reproduction code is not reproduced (that is, the start point of a necessary portion), a control signal is supplied to the control signal generating circuit 10p so as to have the VTRp further rewind the original tape 1p by a predetermined amount (an amount corresponding to the time necessary for the VTRp to get to a stable reproducing state, which is provisionally designated $\Delta TC$). Afterward, the mode determination circuit 9p supplies the control signal generating circuit 10p with a control signal so as to have the VTRp reproduce the original tape 1p by ATC and then with another control signal so as to generate a pause releasing signal to the VTRr. The above operation modes of the VTRp and VTRr according to the operation algorithm and the contents recorded on the original tape 1p and the edited tape 1r are shown in FIG. 16.

According to the seventh embodiment, since the mode determination circuit 9p controls the operation mode of the VTRp to rewind the tape by a portion which has been excessively transported by the fast-forward operation and also controls the VTRr in accordance with the control of the VTRp, the portion c of the necessary portion C will never be dropped on the edited tape 1r.

Figure 17:
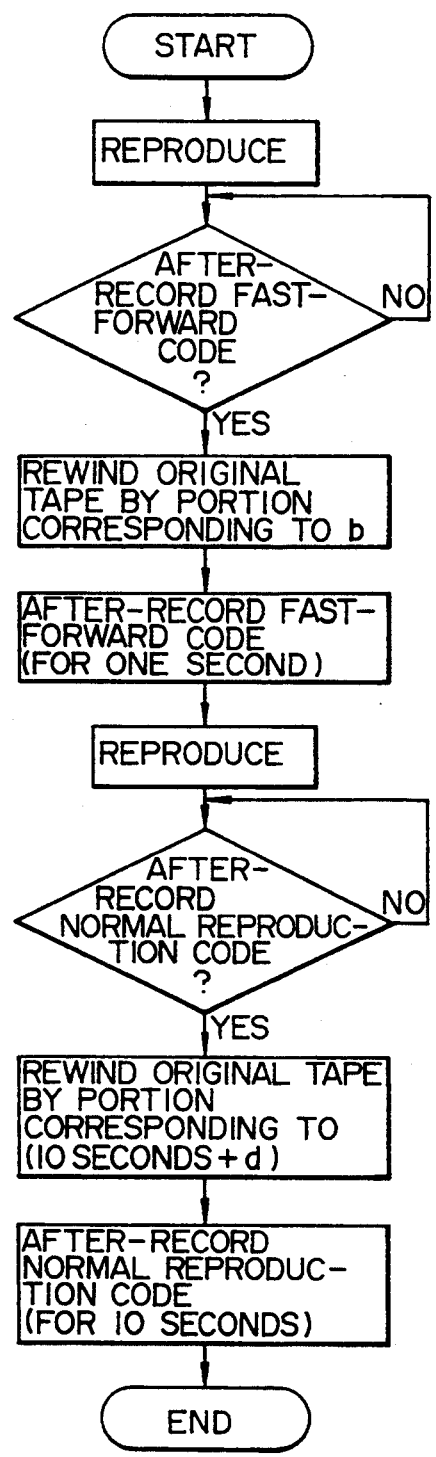
FIG. 17 is a flow chart illustrating an eighth embodiment of the present invention.

Next, an eighth embodiment of the present invention will be described. The sixth and seventh embodiments can prevent the necessary portion from being dropped; however, they cannot prevent the excessive portion b from remaining on the edited tape 1r. The eighth embodiment accordingly corrects this remaining unnecessary portion b by an algorithm shown in FIG. 17 during an operation code after-recording operation. Specifically, when a fast-forward code after-recording is instructed, an original tape 1p is rewound by an amount corresponding to a portion b, and then a fast-forward code is after-recorded on the original tape 1p (in this embodiment, the after-recording period is set to one second). Thus, the fast-forward code is recorded from a position deviated by the amount corresponding to the portion b prior to the unnecessary portion B on the original tape 1p, whereby the edited tape 1r only includes necessary portions dubbed from the original tape 1p, as shown in FIG. 18. The normal-reproduction code is after-recorded after the original tape 1p is rewound by the amount corresponding to 10 seconds in the normal reproduction. In a dubbing edit, the VTRr is set in a recording mode when the end of a normal reproduction code 42 is detected. A portion d on the original tape 1p in FIG. 18 represents the sum of the time for detecting the end of the normal reproduction code 42 and the time required to switch the VTRr from the temporary stop mode to the recording mode.

Incidentally, in the seventh and eighth embodiments, a tape rewinding operation intervenes in an operation code after-recording and a dubbing edit, whereby after-recording or dubbing edit takes a longer time as compared with the sixth embodiment. It is therefore thought to allow the user to select whether or not such an accuracy correcting operation is performed (or which of an editing accuracy and an editing speed is given priority).

Also, it will be apparent that if correction of the amount corresponding to the portion b is made during after-recording, as does the eighth embodiment, while correction of the amount corresponding to the portion c is made during a dubbing edit, as does the seventh embodiment, the resultant edited tape is the same as the tape 1r shown in FIG. 18.

While the foregoing sixth to eighth embodiments have been described for the case where an unnecessary portion is rapidly transported by the fast-forward code, similar effects will be produced by employing a visual search (a fast-forward operation with a video image being displayed). It is also thought to properly use these two methods: for example, the fast-forward operation is used for a long unnecessary portion, and the visual search is used for a short unnecessary portion.

According to the present invention as described above, since the recording period of an operation code can be arbitrarily set by the recording period setting circuit, the operation for after-recording is facilitated.

Also, since the recording period is automatically set by the mode storing circuit in accordance with the previously written operation code, the operation can be accurately controlled in terms of time, the recording time of an information signal is reduced, and the erased portion of a sequential information signal, such as a time code, is also decreased.

Further, by constantly reading a time code recorded when a video signal and an audio signal were recorded; storing the latest time code in the time code storing circuit; generating a time code sequential to the latest time code stored in the time code storing circuit when an information signal is after-recorded; and re-recording the time code together with an operation code in a time division manner, a sequential time code from the beginning to the end of a tape is obtained.

An information signal indicating how many fields after the VTR proceeds to which operation is automatically written prior to a position from which the user has the VTR execute a certain operation, which results in achieving operation control with high positional accuracy. This is effective for printing a still image by using a video printer.

The display of a read operation code written on a magnetic tape on the display unit facilitates an erasure of unnecessary operation codes.

Since an operation code controls a VTR on the reproduction side as well as a VTR on the recording side during a dubbing edit, unnecessary portions are automatically removed on a resultant edited tape.

We claim:

1. An apparatus for recording and reading operation code signals on a magnetic tape to control operating modes of a magnetic recording/reproducing device in magnetically recording and reproducing a video signal and an audio signal on the magnetic tape, the magnetic recording/reproducing device including an operation panel for application to the magnetic recording/reproducing device of operation instructions, said apparatus comprising:

operation code generating means responsive to a fast-forward operation instruction from the operation panel for generating a fast-forward operation code signal based on the fast-forward operation instruction and indicative of a fast-forward operating mode of the magnetic recording/reproducing device and responsive to a normal-reproduction operation instruction from the operation panel for generating a normal-reproduction operation code signal based on the normal-reproduction operation instruction and indicative of a normal-reproduction operating mode of the magnetic recording/reproducing device;

recording period setting means responsive to the fast-forward operation instruction from the operation panel for generating a fast-forward recording period setting signal based on the fast-forward operation instruction and indicative of a fast-forward time duration for recording the fast-forward operation code signal and responsive to the normal-reproduction operation instruction from the operation panel for generating a normal-reproduction recording period setting signal based on the normal-reproduction operating instruction and indicative of a normal-reproduction time duration, longer than the fast-forward time duration, for recording the normal-reproduction operation code signal;

recording means responsive to the fast-forward operation code signal and the fast-forward recording period setting signal for recording the fast-forward operation code signal on the magnetic tape for a fast-forward time duration indicated by the fast-forward recording period setting signal and in an information signal area at which the video signal and the audio signal are not recorded and responsive to the normal-reproduction operation code signal and the normal-reproduction recording period setting signal for recording the normal-reproduction operation code signal in the information signal area on the magnetic tape for a normal-reproduction time duration indicated by the normal-reproduction recording period setting signal;

reading means for reading the fast-forward operation code signal and the normal reproduction signal from the information signal area;

mode determination means responsive to the read fast-forward operation code signal for generating a fast-forward operating mode command to cause operation of the magnetic recording/reproducing device in the fast-forward operating mode and responsive to the read normal-reproduction operation code signal for generating a normal-reproduction operating mode command to cause operation of the magnetic recording/reproducing device in the normal-reproduction operating mode; and output means for outputting the fast-forward operating mode command and the normal reproduction operating mode command for application to the magnetic recording/reproducing device to cause operation thereof in the fast-forward operating mode and in the normal-reproduction operating mode, respectively.

* * * * *